United States Patent [19]

Cline

[11] Patent Number: 4,765,092
[45] Date of Patent: Aug. 23, 1988

[54] METHOD AND APPARATUS FOR GROWING SPROUTS

[76] Inventor: Dean R. Cline, 8875 Mission Gorge Rd., Santee, Calif. 92071

[21] Appl. No.: 349,024

[22] Filed: Feb. 16, 1982

[51] Int. Cl.$^4$ .................. A01G 31/00; A01G 31/02
[52] U.S. Cl. ................................. 47/61; 47/65
[58] Field of Search .................. 47/14, 16, 58, 59, 60, 47/61, 62, 63, 64, 65; 51/164.1; 74/575; 34/43

[56] References Cited

U.S. PATENT DOCUMENTS

| | | | |
|---|---|---|---|
| 1,408,009 | 2/1922 | Kurowski | 400/577 |
| 3,487,840 | 1/1970 | Stenzel et al. | 51/164.1 |
| 3,643,376 | 2/1972 | Poindexter et al. | 47/61 |
| 3,890,719 | 6/1975 | Braga et al. | 34/43 |
| 3,911,619 | 10/1975 | Dodolph | 47/58 |
| 4,114,315 | 9/1978 | Rinella | 47/16 |
| 4,237,651 | 12/1980 | Caballero | 47/58 |
| 4,258,501 | 3/1981 | Brown | 47/16 |

Primary Examiner—Richard J. Johnson
Attorney, Agent, or Firm—Baker, Maxham & Jester

[57] ABSTRACT

A method and apparatus for growing sprouts from seeds. The seeds are washed and placed in a tumbler where water and air are circulated while they are periodically tumbled. The incubated seeds are rinsed to remove hulls and ungerminated seeds and wrapped. Some seeds such as alfalfa seeds are placed in a dark room after rinsing where they are moisturized and aerated. Then they are moisturized and aerated under indirect natural light and/or grow lights until they begin to mature. They are next wrapped in a transparent cover while damp and are placed under growing lights and/or indirect natural light for final growth.

17 Claims, 3 Drawing Sheets

METHOD AND APPARATUS FOR GROWING SPROUTS

BACKGROUND OF THE INVENTION

Sprouts such as alfalfa sprouts have become a very popular food due to their taste and the nourishment and protein which they provide. They are used in large quantities in places like salad bars and health food stores. They are also available in grocery stores.

Alfalfa sprouts will spoil if they are not cleaned and freed of hulls. They also spoil from breakage. When they spoil they turn unsightly and develop an unpleasant smell. Alfalfa sprouts are grown from seeds and germinate without planting in soil. The conventional process for growing alfalfa sprouts is to spread them and water them while they grow, leaving the hulls and ungerminated seed with the sprouts. The hulls and ungerminated seed cause spoilage. A brown spot the size of a quarter will grow to the size of an orange in one hour during the summer time. The smell of the fermenting hulls and seeds is very noticeable and brown mush develops.

SUMMARY OF THE INVENTION

These deficiencies are overcome by the method and apparatus of the present invention wherein the seeds are first washed and then placed in a tumbling means where they are exposed to a water mist and a supply of circulating air while they are periodically tumbled. When they have grown to the point where the hulls are loose, they are removed and rinsed, the hulls and ungerminated seed being removed. If they are alfalfa type seeds, the sprouts are then placed in a darkroom where they are moisturized and aerated until shoots or leaves appear on the top. Next they are watered and aerated under indirect and/or grow lights until they begin to mature. They are then wrapped with a transparent covering while damp and placed under growing lights and/or indirect natural light for final growth.

DETAILED DESCRIPTION OF THE INVENTION

Figure 1:
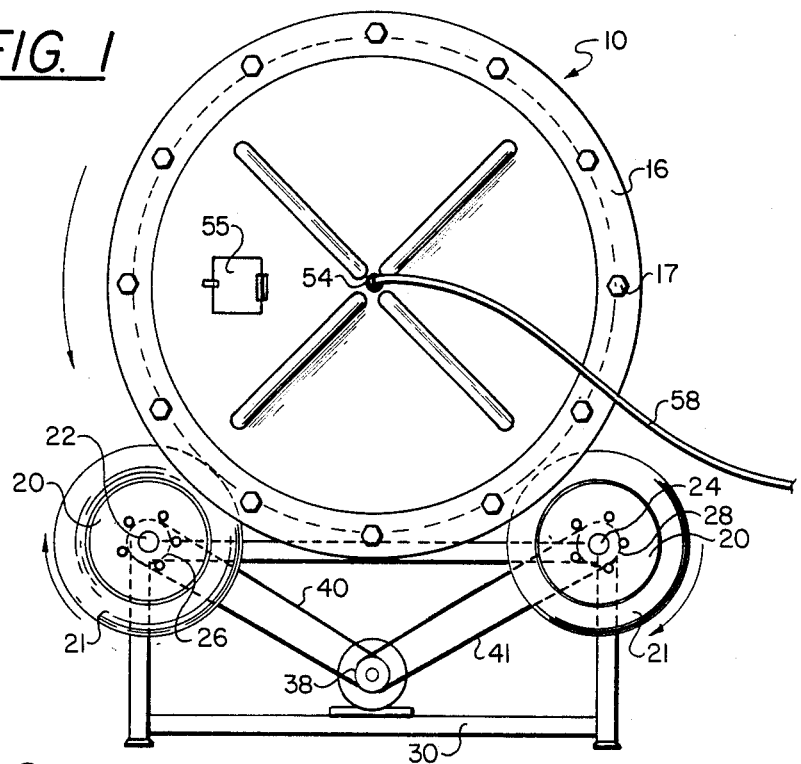
FIG. 1 is an end elevation of the tumbling chamber of the present invention.
Figure 2:
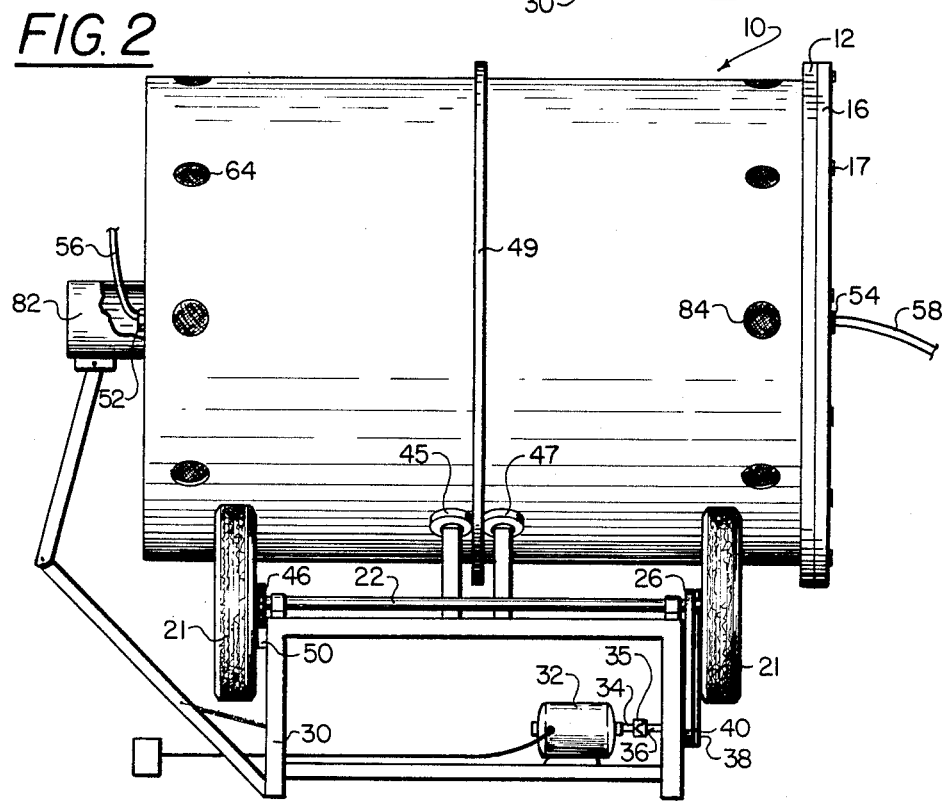
FIG. 2 is a side elevation of the tumbling chamber shown in FIG. 1.
Figure 3:
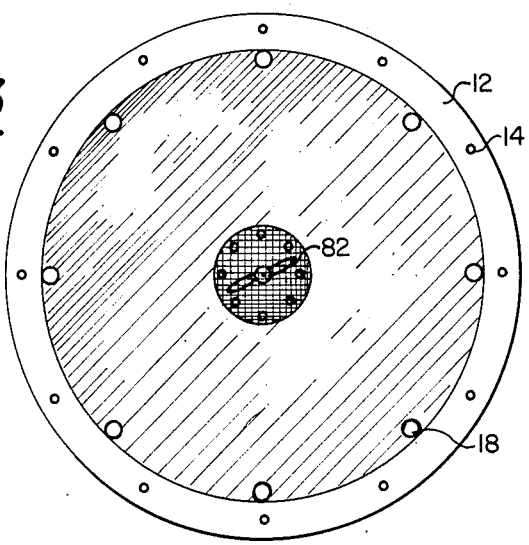
FIG. 3 is an end view of the barrel of the tumbling chamber with the cover removed to show internal construction.

Referring to the drawings, the alfalfa seeds, which are about the size of sand grains, are first washed and drained thoroughly. In the first part of the washing process a brown liquid, generally referred to as rejuvilac, drains off. This thorough cleansing reduces bacteria and enzymes and prepares the seed for further processing. The seeds are then placed in a tumbler barrel 10 which is an elongated cylinder formed of a material such as polyvinylcloride. The barrel is open at one end as shown in FIG. 3 and has a flange 12 thereon with holes 14 for mounting a cover 16 by means such as bolts 17. The cleansed seeds are placed in the barrel 10 through this open end. The barrel 10 includes several longitudinal ribs 18 which serve to separate the seeds and sprouts when the barrel is rotated to keep them from adhering into a mass or snowballing. Such snowballing can be particularly harmful when the seeds have grown into the sprout stage because breakage of sprouts causes spoilage.

When the seeds have been fed into the barrel 10 and the cover 16 is fixed in place, the barrel is rotated by four wheels 20 having rubber tires 21 thereon. Two tires 21 engage the barrel 10 on each side of the barrel near the bottom. The wheels 20 are mounted on axles 22 and 24 which also include sprockets 26 and 28. The axles are mounted on a metal frame 30. An electric motor 32 containing a gear box is also mounted on frame 30. The motor 32 includes a shaft 34 mounted through a coupling 35 to a shaft 36 containing a sprocket 38. A chain 40 extends around the sprockets 26 and 38 and a chain 41 extends around sprockets 38 and 28. A single chain can be extended around all three sprockets with an idler wheel to take up tension.

The motor is energized by the timing switch 44. The motor drives the wheels 20 through the chains 40 and 41 and rotates the barrel 10. The barrel is rotated ¼ turn every 30 minutes by the operation of timing switch 44 while a batch of seeds is inside. The barrel rotates at a rate of about one and one-quarter revolutions per minute. A rapid rate of rotation causes the sprouts to break. In the summer time, the barrel is rotated about every twenty minutes. A ratchet disk 46 is provided on the axle 22 and the disk includes teeth. A spring finger 50 is mounted on the frame 30 and engages the teeth on the ratchet disk 46 to provide a ratchet effect and to keep the barrel from sliding backward under the weight of the seeds. A pair of ball bearing mounted guide wheels 45 and 47 of hard rubber are mounted on the frame and engage the barrel, one on each side of the flanges 49 to prevent the barrel 10 from walking in an endwise direction.

Figure 4:
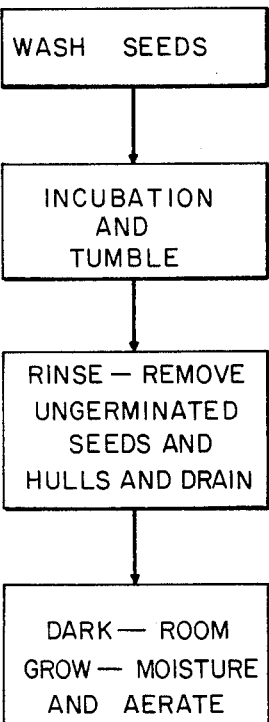
FIG. 4 is an elevation of the control mechanism for the tumbling chamber shown in FIGS. 1-3.
Figure 4:
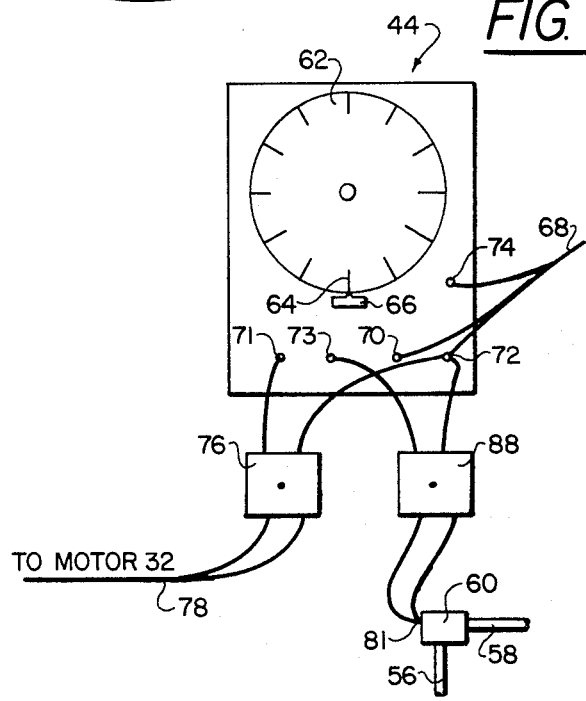
Figure 5:
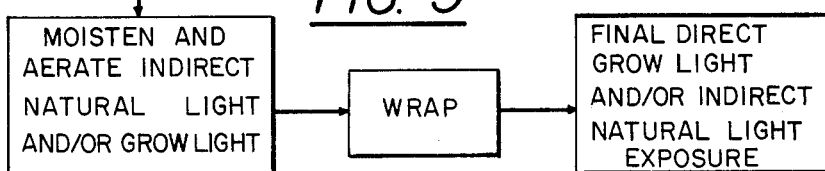
FIG. 5 is a flow diagram showing the steps of the process of the present invention.

A swivel coupling 52 is provided on the closed end of barrel 10 and a swivel coupling 54 is provided on the cover 16. These swivel couplings are connected to hoses 56 and 58 which are in turn connected to a water source (not shown). The hoses are connected to a solenoid operated valve 60 (FIG. 4). The timing switch 44 switches water on through the hoses to the couplings for approximately two minutes when a one-quarter rotation of the barrel is started. The one-quarter rotation takes place in about twenty seconds. The water is shut off after about two minutes until another rotation is started twenty or thirty minutes later. The couplings 52 and 54 include nozzles that spray moisture toward the center of the longitudinal axis of the barrel where the heat is greatest. The seeds and sprouts generate heat like a compost pile and need cooling. The timing switch 44 (FIG. 4) includes a conventional timer dial 62 with extensions 64 which can be set for tripping by the trigger 66. A power supply line 68 is connected to terminals 70 and 72 with the ground line connected at 74. A time delay 76 is connected to the timer switch terminals 71 and 72 and to the electric motor 32 through electric line 78. A time delay 80 is connected to the timer switch terminals 72 and 73 and through line 81 to the solenoid operated water valve 60.

A blower 82 is mounted on the closed end of barrel 10 and blows air continually into the barrel. Outlet screens 84 are provided in the barrel so that the air from the blower 82 can escape. The spraying of the water and the blowing of the air provides controlled cooling along with the oxygen supply needed for germination. A batch of seed is run in the tumbler for forty-eight to seventy-two hours. During this time the seeds will grow sprouts and the hulls will loosen. About forty-eight hours is usually the best period of time. The tumbling loosens the hulls from the sprouts without breaking the sprouts. About ten percent of the seeds do not germinate so the batch includes ungerminated seeds and hulls. Water from the barrel drains out the end of the barrel because the barrel is slightly tilted in the longitudinal direction. A door 55 permits access to the interior of the barrel 10 for inspection. The sprouts, ungerminated seeds and hulls are removed from the barrel for the next step in the process.

Figure 6:
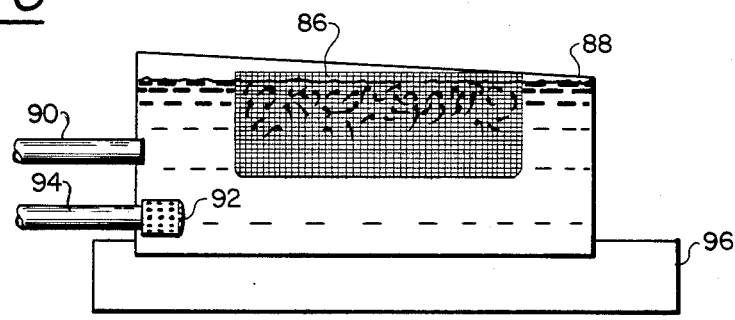
FIG. 6 is a side elevation of the rinsing mechanism used to rinse the sprouts after they have been incubated and tumbled.
Figure 7:
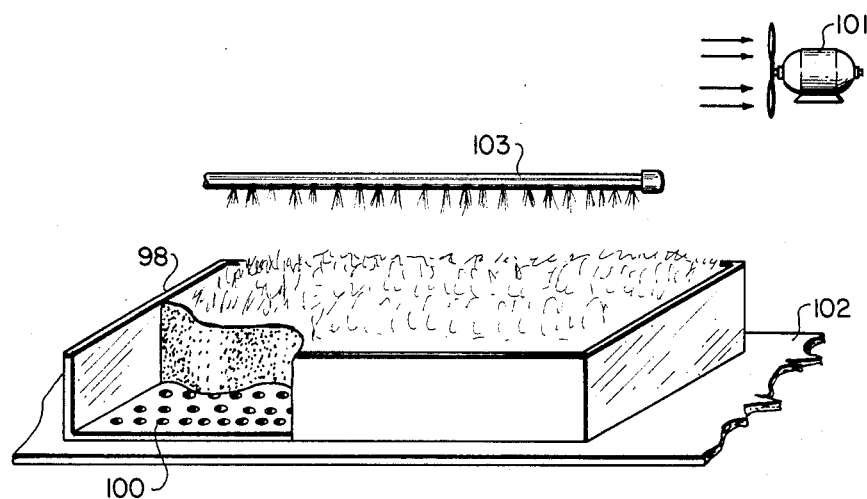
FIG. 7 is a partial perspective view of the arrangement for moistening and aerating the sprouts after they have been rinsed.
Figure 8:
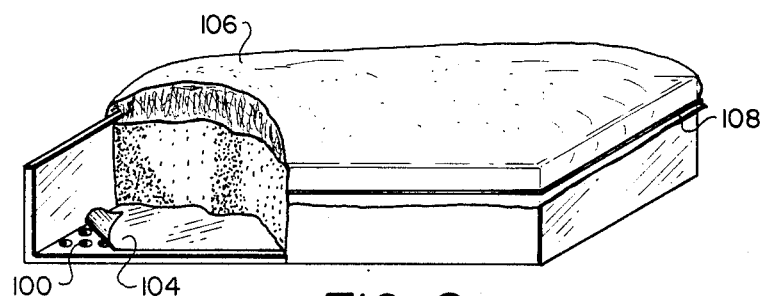
FIG. 8 is a perspective view, partially broken away, showing the packaged sprouts.

The sprouts, which are now about two-thirds grown with the hulls loosened, are placed in a mesh or screen basket 86 as shown in FIG. 6. The basket is placed in a rinse tank 88 which is continually supplied with water through hose 90. The water is agitated by air bubbler 92 connected through air hose 94 to a supply of air (not shown). The tank is tilted slightly for run-off and the hulls and ungerminated seeds drop through the screen into the bottom of the tank or are floated off on the surface of the water in the tank as it spills into a drainage tank 96. After the sprouts are rinsed, they are removed from the screen basket and placed in a plastic tray 98 having drain holes 100 in the bottom thereof (FIG. 7).

Thereafter, the trays 98 are placed on a shelf 102 in a dark room where they are kept for approximately forty-eight hours. Air is continually drawn through the room by fan 101. Water is sprayed over the sprouts every thirty minutes for a period of about thirty seconds by spray tubes 103. It is necessary to keep the sprouts wet and cool. Preferably, the temperature is between about 72 degrees F. and 78 degrees F. During this period of time, the sprouts puff up like a cake and the leaves begin to open and start to turn green.

Next, they are subjected to indirect natural light and/or artificial light such as Quartz lamps or grow lights for a period of about twelve hours. They are sprayed periodically and continually subjected to air flow as discussed above. Thereafter, the spraying is stopped and the sprouts are subjected to the light and the air for about another twelve hours so that excess moisture is dried off. The sprouts need to be damp but not sloppy wet. During this part of the process, air must not be blow directly on the sprouts or they shrivel and turn hair-like in texture. Air is drawn through the room rather than blown into it.

It is important to grow the sprouts slowly and in a cool atmosphere for a controlled period of time. If they are grown too rapidly or too long, the leaves flatten out, the stems thicken and the sprouts become tough and bitter. The sprouts are about two and one-half inches long when sold.

The tray is then dumped upside down on a sheet of fiber glass. The tray is removed, the bottom of the sprouts inspected, and a piece of wax paper 104 is placed in the bottom of the tray. The tray is again placed over the sprouts and turned right side up, weighed and labeled. A sheet 106 of transparent, flexible material such as Saran Wrap is placed over the tray and held in place with a rubber band 108. The tray is placed under grow lights and/or indirect natural light for about twelve hours for final greening while still moist. The sprouts are ready for storage or delivery.

In the winter time, the water used in all steps of the operation except rinsing is heated to about 90 degrees F. By the time it travels through the pipes and is sprayed, the temperature is about 78 degrees or 80 degrees F.

The above description relates to the growing of alfalfa sprouts which are hay-like in appearance when grown. The process and apparatus also apply to seeds which grown shorter sprouts. Examples of such seeds are radish, mung, lentil, pea and azuki red bean.

These seeds are processed through the wash, incubate and tumble, rinse and wrap steps of the process. They are not subjected to the dark room, moisten and aerate, and final grow light steps. These seeds are incubated in the tumbler until they are about one-quarter to one-half inch long. They are removed from the tumbler, rinsed to remove hulls and ungerminated seed, and wrapped while moist in the same manner as alfalfa sprouts. These sprouts are then ready for storage and delivery.

Due to the unusually clean nature of the sprouts produced by the method and apparatus of the present invention, the sprouts can be stored with or without refrigeration for a considerably longer period of time. They are clean and fresh in appearance and smell, and are sweet to the taste.

Having thus described my invention.

I claim:

1. A process for growing commercial quantities of sprouts from seeds having hulls, comprising the steps of:
   selecting a quantity of seeds suitable for sprouting;
   washing said seeds in water;
   placing said seeds in a rotatable container mounted for rotation about a horizontal axis;
   subjecting said seeds to periodic sprays of moisture and a continuous flow of air in said rotatable container until the seeds have grown so that a substantial portion of the hulls are loose;
   loosening additional ones of said hulls in a manner which minimizes breakage of the sprouts;
   removing said sprouts from said container and rinsing said sprouts to remove hulls and ungerminated seeds; and
   placing said sprouts in a tray and covering said sprouts with a transparent covering while moist.

2. A process for growing sprouts from seeds according to claim 1 wherein the sprouts are alfalfa sprouts, and after the step of rinsing the sprouts, then placing said sprouts in a dark room, periodically applying moisture and continuously circulating air until the sprouts expand as the result of further growth;
   removing said sprouts from the dark room and placing said sprouts in artificial light or indirect natural light and applying moisture until they begin to mature; and
   subjecting said sprouts to artificial growing light or indirect natural light for final growth.

3. A process for growing sprouts from seeds according to claim 1 wherein the sprouts are placed loosely in the tray to accommodate further growth.

4. A process for growing sprouts from seeds in accordance with claim 1 including the step of moving said seeds slowly by rotation of said rotatable container while they are growing and developing to avoid forming large masses and to gain maximum exposure to moisture and air.

5. A process for growing sprouts according to claim 1 including the step of periodically rotating said container for preventing said sprouts from accumulating in large masses.

6. A process for growing sprouts according to claim 2 wherein the sprouts are removed from the container after about forty-eight to seventy-two hours, and are removed from said dark room after about forty-eight hours.

7. A process for growing sprouts according to claim 2 wherein the sprouts are subjected to said final growth lighting for a period of about twelve hours.

8. A process for growing sprouts according to claim 7 wherein the sprouts are maintained under said final growth lighting for a period of about twelve hours after moisturizing ceases.

9. A process for growing sprouts according to claim 4 wherein;
the rotation of said container is at a rate of about one-fourth turn in about twenty seconds.

10. A process of growing sprouts according to claim 9 wherein said periodic sprays of moisture are for a duration of about two minutes within a period of from about twenty to about thirty minutes.

11. A process for growing sprouts according to claim 5 wherein said container is rotated about one-fourth turn about every twenty minutes to one-half hour.

12. An apparatus for growing commercial quantities of sprouts from seeds, comprising:
a drum including a cylindrical chamber rotatable about a horizontal axis for receiving said seeds;
means for rotating said drum at a controlled rate;
separation means in said chamber for preventing said seeds from collecting in a mass when said drum is rotated;
spray means at each end of said drum for spraying water mist into said chamber toward the center thereof;
blower means positioned on said drum and communicating with the interior of said chamber for blowing air into said chamber; and,
exhaust means on said drum for exhausting air from the interior of said chamber.

13. An apparatus for growing sprouts from seeds according to claim 12 including control means for controlling the periodic rotation of said drum and for controlling the periodic spraying of water.

14. An apparatus for growing sprouts from seeds according to claim 12 wherein the outer surface of said drum is a cylinder and said rotating means comprises four wheels having tires thereon, two on each side of said cylinder for engaging the outer wall of said cylinder; and
a power source for driving said four wheels for rotating said drum.

15. An apparatus for growing sprouts from seeds according to claim 14 including means for preventing said cylinder from rolling back in opposition to the direction of intended rotation.

16. An apparatus for growing sprouts from seeds according to claim 15 including a flange around the circumference of said cylinder; and
a pair of guide wheels engaging each side of said flange for limiting the movement of said cylinder along its longitudinal axis.

17. An apparatus for growing commercial quantities of sprouts from seeds, comprising:
a drum mounted for rotation about a horizontal axis and including a cylindrical chamber for receiving a charge of at least several pounds of seeds;
means for rotating said drum at controlled intervals and at a controlled rate of speed;
a plurality of elongated longitudinal ribs in said drum for preventing said seeds from collecting in a mass when said drum is rotated;
spray means at each end of said chamber for spraying water mist into said chamber toward the center thereof;
control means for controlling the drive means for periodic rotation of said tumbling means and for controlling spray means for the periodic spraying of water;
blower means positioned on said drum and communicating with the interior of chamber for blowing air into said chamber; and
exhaust ports on said drum for exhausting air from the interior of said chamber;
said drive means comprises four wheels having tires thereon, two on each side of said cylinder for engaging the outer wall of and supporting said cylinder; and
a motor drivingly connected to said four wheels; and
means for preventing said cylinder from rolling back in opposition to the direction of intended rotation.

* * * * *